(12) United States Patent
Chopping

(10) Patent No.: US 6,199,205 B1
(45) Date of Patent: *Mar. 6, 2001

(54) DATA DELIVERY SERVICES

(75) Inventor: Geoffrey Chopping, Wimbourne (GB)

(73) Assignee: Marconi Communications Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,618

(22) PCT Filed: Aug. 15, 1996

(86) PCT No.: PCT/GB96/01992

§ 371 Date: Mar. 20, 1998

§ 102(e) Date: Mar. 20, 1998

(87) PCT Pub. No.: WO97/07634

PCT Pub. Date: Feb. 27, 1997

(30) Foreign Application Priority Data

Aug. 16, 1995 (GB) .................................................. 9516813

(51) Int. Cl.[7] .................................................. H04N 7/16
(52) U.S. Cl. ............................................ 725/30; 725/123

(58) Field of Search ................................ 455/3.2, 5.1, 6.2, 455/6.3; 348/12, 13, 10; H04N 7/20

(56) References Cited

U.S. PATENT DOCUMENTS 5,579,367 * 11/1996 Raymond et al. ...................... 455/3.2
5,603,077 * 2/1997 Muckle et al. ......................... 455/3.2

FOREIGN PATENT DOCUMENTS

WO 94/10803 5/1994 (WO) .
WO 94/14273 * 6/1994 (WO) ........................... H04M/11/08
WO 94/24783 10/1994 (WO) .

* cited by examiner

Primary Examiner—Victor R. Kostak
(74) Attorney, Agent, or Firm—Kirschstein, et al.

(57) ABSTRACT

A telecommunications data transmission system can provide transmission of data blocks using a unidirectional broadband link and a duplex narrowband link between two subscribers, the narrowband link providing control and addressing information regarding the data blocks sent via the broadband link from the first to the second subscriber, the transmission on the broadband link possibly being sent using Motion Picture Expert Group 2 encoding.

8 Claims, 2 Drawing Sheets

DATA DELIVERY SERVICES

Motion Picture Expert Group-2 (MPEG-2) is one system for encoding video in a digital form, though it is to be expected that other encoding systems will occur in the future.

MPEG-2 can be transported via terrestrial radio, satellite and cable using the appropriate transmission modulation schemes and associated forward error correction methods. This provides a good quality video delivery arrangement and has a large bandwidth.

An MPEG-2 signal also includes the multi-channel audio encoding and the carrying of additional data.

Many MPEG-2 signals of encoded video, each with additional audio and data information, can be carried by one MPEG-2 TRANSPORT STREAM.

If required an MPEG-2 signal can carry only audio, or only data, which means that an MPEG-2 TRANSPORT STREAM has use as a general purpose method of carrying multiple data signals.

Consequently as the use of MPEG-2 increases, for delivering video, so does the opportunity to use the MPEG-2 TRANSPORT STREAM as a means of delivering other data services.

A complete MPEG-2 signal carrying only data as a high bit rate Teletext type of service may be used for providing general information. However such a fixed type of service is only suitable for carrying general public information even if a charge is made for receiving the information.

While MPEG-2 forms a convenient encoding and transport system for the transmission of data, other systems may be used.

SUMMARY OF THE INVENTION

According to the present invention there is provided a telecommunications data transmission arranged for transmission of data blocks and comprising a unidirectional broadband link and a duplex narrowband start-up link between a first and a second terminal the narrowband link providing control and addressing information regarding data blocks sent via the broadband link from the first to the second terminal.

The broadband link may be a satellite link.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Using conventional dial-up narrowband circuits it is possible for a remote subscriber to be connected to a database. The call can be initiated by the subscriber or the database.

The quantity of information that subsequently needs to be transferred from the database to the subscriber may be expensive for the capability of the dial-up narrowband circuit.

Figure 1:
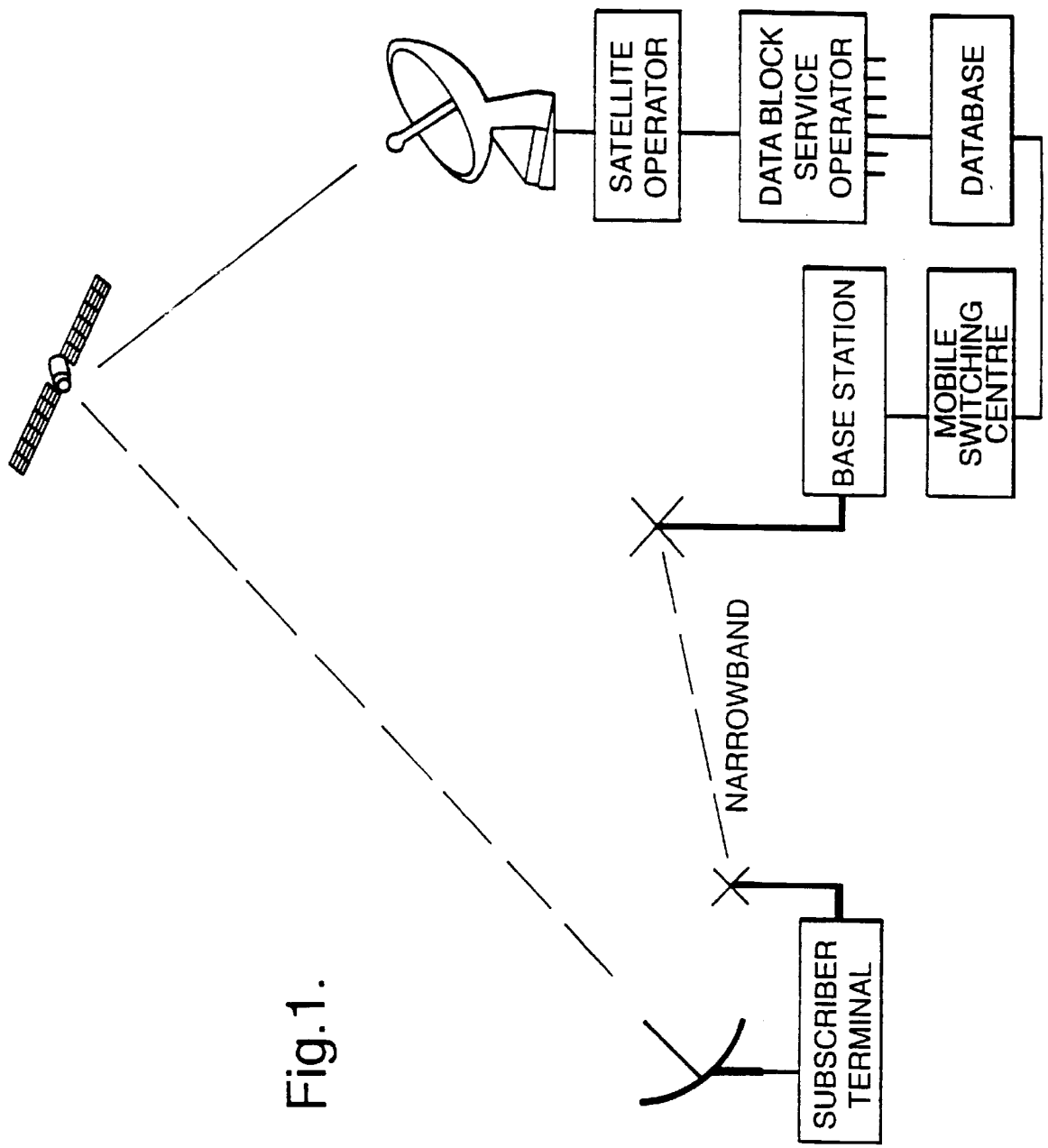
FIG. 1 is a diagrammatic illustration of a unidirectional data delivery system.

If the subscriber is connected to an MPEG-2 Delivery Service, for example via a satellite as shown in FIG. 1, then if the Database can forward an encrypted block of MPEG-2 data, to the Data Block Service Operator, for forwarding to the Satellite Operator, then the encrypted block of MPEG-2 data can be sent up to the satellite for broadcasting.

In order to ensure that only the correct Subscriber Terminal can decode the information, the encryption key is sent to the subscriber from the database via the narrowband circuit. The Subscriber Terminal is also supplied with further addressing necessary to identify the encrypted block of data intended for the Subscriber Terminal. The header, the further address and the sequence number should not be encrypted.

The unidirectional service described above can be used for a large number of applications. One application is for a head office sending information to one of its remote sites, particularly if they have temporary locations such as building sites.

Provided some Subscriber Terminals have the necessary packet identity codes, further addressing and encryption keys then a head office can broadcast to many local offices at the same time.

Although the use of Motorised Satellite Receivers enables the Subscribers Terminal to be portable, the use of Terrestrial Radio with Orthogonal Frequency Division Modulation (OFDM) modulation would enable the Subscriber Terminal to be mobile.

The broadcast satellite used for this service only requires to be able to receive from one ground station. It does not need to be a communications satellite which can receive from many moving ground stations.

The unidirectional arrangement above relies on the Database having a wideband connection to the Data Block Service Operator.

Two databases which were both connected onto the same Data Block Service Operator would be able to perform block transfers without using the satellite.

It is possible for two Databases which are connected to Different Block Service Operators on different satellites, perhaps several thousand miles apart, to perform bidirectional data transfers. Provided that each Database also had a motorised satellite receiver and subscribers terminal, so that it can receive from the appropriate satellite, then two unidirectional paths can be configured.

Figure 2:
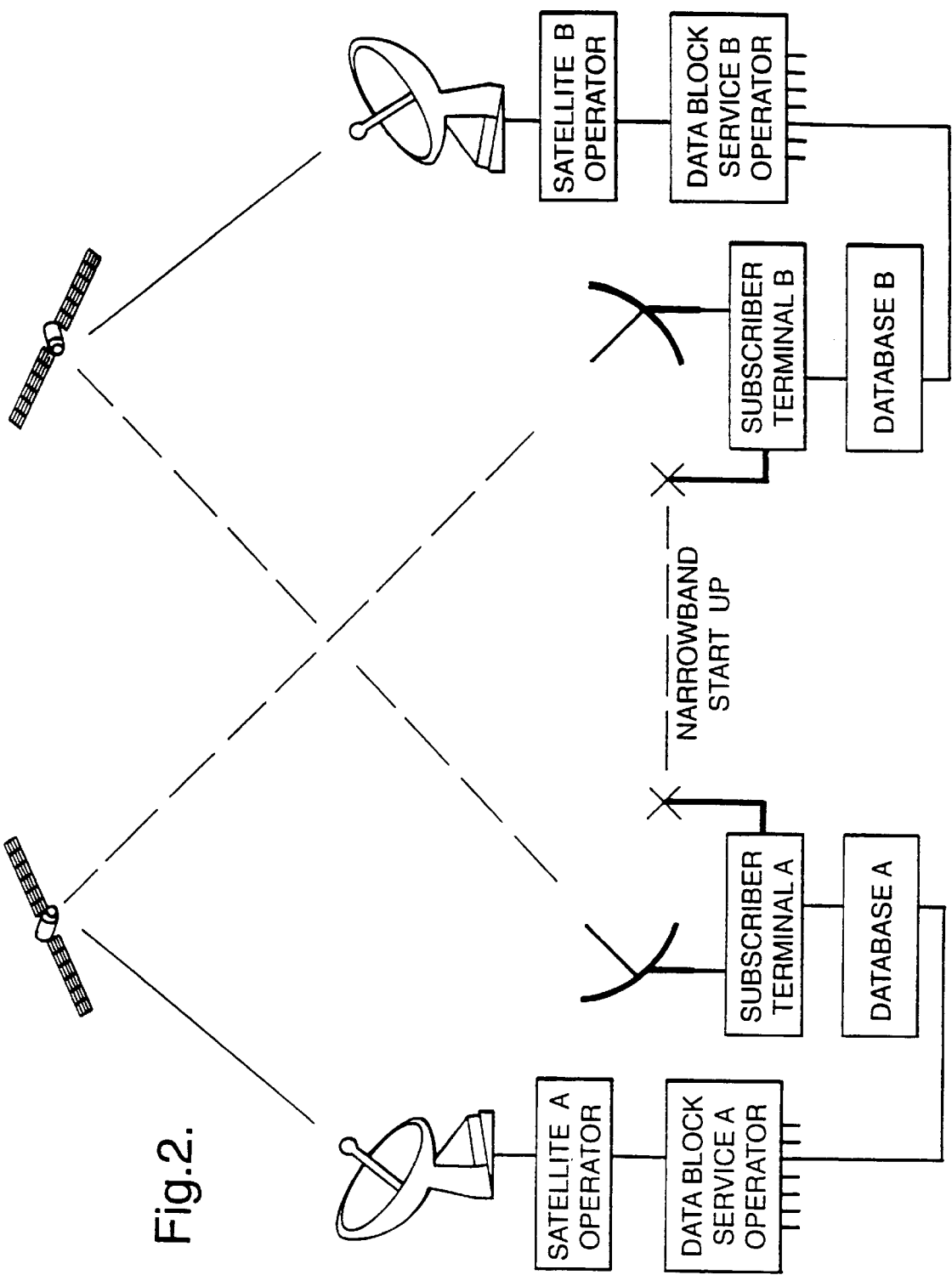
FIG. 2 is a diagrammatic illustration of a bidirectional data delivery system.

In FIG. 2, one path is from Database A, via Data Block Service Operator A and Satellite A, to the motorised satellite receiver and Subscribers Terminal of Database B.

The other path is from Database B, via Data Block Service Operator B and Satellite B, to the motorised satellite receiver and Subscribers Terminal of Database A.

In order to establish the bi-directional path only one narrowband path should be needed.

Provided the Data Block Service Operator is prepared to leave addresses in place then the narrowband path could be cleared once the two unidirectional paths were established, however this would mean there was no positive acknowledgement of an encrypted block of MPEG-2 data, unless the acknowledgement is performed by the sending of a complete encrypted block of MPEG-2 data in the opposite direction. A standard small acknowledgement block can be used for this.

Another use for the motorised satellite receiver and subscribers terminal that is equipped with a Database, is to directly monitor that the encrypted blocks of MPEG-2 data are being correctly forwarded by the satellite.

The size of the encrypted blocks of MPEG-2 data should be about one Mbit, in order to achieve a reasonable throughput with only one block outstanding though perhaps several sizes can be accepted:

Very Small Acknowledgement Block (Bi-directional Service only)

Small encrypted data block of MPEG-2 (perhaps 0.5 Mbit/s)

Medium encrypted data block of MPEG-2 (perhaps 1.0 Mbit/s)

Large encrypted data block of MPEG-2 (perhaps 2.0 Mbit/s)

The download rate may be constrained by the data rate of the link between the Database and the Data Block Service Operator.

Charging will probably be done on a per block basis, with different rates for different block sizes.

What is claimed is:

1. A telecommunications data transmission system, comprising:
   a) a database for storing and encrypting blocks of data, and for generating an encryption key;
   b) a subscriber terminal remote from the database;
   c) a unidirectional broadband link operatively connected between the database and the subscriber terminal, for transmitting the encrypted blocks of data from the database to the subscriber terminal along the broadband link;
   d) a duplex narrowband link operatively connected between the database and the subscriber terminal, for transmitting the encryption key from the database to the subscriber terminal in one direction along the narrowband link; and
   e) the subscriber terminal being operative for initiating the transmission of the encrypted blocks of data by transmitting a call signal from the subscriber terminal to the database in a direction opposite to said one direction along the narrowband link.

2. The system of claim 1, wherein the broadband link includes a satellite for receiving and broadcasting the encrypted blocks of data.

3. The system of claim 1, wherein the encrypted blocks of data are encoded in a motion picture expert group-2 (MPEG-2) format.

4. The system of claim 1, wherein the database is operative for initiating the transmission of the encrypted blocks of data by transmitting a transmit signal from the database to the subscriber terminal in said one direction along the narrowband link.

5. A telecommunications data transmission system, comprising:
   a) first and second databases for respectively storing and encrypting first and second blocks of data, and for respectively generating first and second encryption keys;
   b) first and second subscriber terminals respectively located remotely from the second and first databases;
   c) a first unidirectional broadband link operatively connected between the first database and the second subscriber terminal, for transmitting the first encrypted blocks of data from the first database to the second subscriber terminal along the first broadband link;
   d) a second unidirectional broadband link operatively connected between the second database and the first subscriber terminal, for transmitting the second encrypted blocks of data from the second database to the first subscriber terminal along the second broadband link;
   e) a duplex narrowband link operatively connected between the first and second subscriber terminals, and also operatively connected between the first and second databases, for transmitting the first and second encryption keys in opposite directions along the narrowband link; and
   f) the first and second subscriber terminals being operative for respectively initiating the transmission of the first and second encrypted blocks of data by respectively transmitting first and second call signals in opposite directions along the narrowband link.

6. The system of claim 5, wherein each broadband link includes a satellite for respectively receiving and broadcasting the respective encrypted blocks of data.

7. The system of claim 5, wherein each encrypted blocks of data is encoded in a motion picture expert group-2 (MPEG-2) format.

8. The system of claim 5, wherein the first and second databases are operative for respectively initiating the transmission of the first and second encrypted blocks of data by respectively transmitting first and second transmit signals in opposite directions along the narrowband link.

\* \* \* \* \*